(12) United States Patent
Hirano et al.

(10) Patent No.: US 8,731,357 B2
(45) Date of Patent: May 20, 2014

(54) OPTICAL FIBER

(75) Inventors: Masaaki Hirano, Yokohama (JP);
Tetsuya Haruna, Yokohama (JP);
Yoshiaki Tamura, Yokohama (JP);
Yoshinori Yamamoto, Yokohama (JP)

(73) Assignee: Sumitomo Electric Industries, Ltd.,
Osaka-shi, Osaka (JP)

( * ) Notice: Subject to any disclaimer, the term of this patent is extended or adjusted under 35 U.S.C. 154(b) by 85 days.

(21) Appl. No.: 13/614,015

(22) Filed: Sep. 13, 2012

(65) Prior Publication Data
US 2013/0077925 A1    Mar. 28, 2013

Related U.S. Application Data

(60) Provisional application No. 61/538,428, filed on Sep. 23, 2011.

(30) Foreign Application Priority Data

Mar. 2, 2012    (JP) ................................. 2012-047010

(51) Int. Cl.
*G02B 6/02*    (2006.01)
*G02B 6/028*    (2006.01)

(52) U.S. Cl.
CPC .......... *G02B 6/0228* (2013.01); *G02B 6/02004* (2013.01); *G02B 6/02214* (2013.01); *G02B 6/02219* (2013.01); *G02B 6/02266* (2013.01); *G02B 6/028* (2013.01); *G02B 6/0281* (2013.01)
USPC .......................................... 385/124; 385/123

(58) Field of Classification Search
CPC ........... G02B 6/02004; G02B 6/02214; G02B 6/02219; G02B 6/02266; G02B 6/0228; G02B 6/028; G02B 6/0281
USPC .................................................. 385/123, 124
See application file for complete search history.

(56) References Cited

U.S. PATENT DOCUMENTS 6,084,993 A * 7/2000 Mukasa ........................... 385/24
6,421,489 B1 * 7/2002 Berkey et al. .................. 385/123

(Continued)

FOREIGN PATENT DOCUMENTS

| JP | 2005-202440 | 7/2005 |
|---|---|---|
| WO | 00/62106 | 10/2000 |
| WO | 2011/066063 | 6/2011 |

OTHER PUBLICATIONS

Vittorio Curri et al., "Performance Evaluation of Long-Haul 111 Gb/s PM-QPSK Transmission Over Different Fiber Types," IEEE Photonics Technology Letters, Oct. 1, 2010, pp. 1446-1448, vol. 22, No. 19.

*Primary Examiner* — Ryan Lepisto
(74) *Attorney, Agent, or Firm* — Drinker Biddle & Reath LLP (57) ABSTRACT

An optical fiber includes a core section and a cladding section. A k value expressed by $k=4A_{eff}/(\pi MFD^2)$ is 1.08 or larger, $A_{eff}$ being an effective area and MFD being a mode field diameter, at a wavelength of 1550 nm, a chromatic dispersion is in a range from +19.0 ps/nm/km to +21.9 ps/nm/km, and MFD is in a range from 10.3 μm to 13.0 μm. The inequality, $r_1 < r_2 < r_3$, is established, $R = r_3/r_2$ is larger than 1.0 and equal to or smaller than 5.4, and a relative refractive index difference $\Delta_{12}$ of the maximum value $N_2$ with respect to the minimum value $N_1$ is 0.05% or higher, $r_1$ and $r_2$ being radial positions respectively with minimum and maximum value $N_1$ and $N_2$ of a refractive index in the core section and $r_3$ being a radius of the core section.

21 Claims, 10 Drawing Sheets

(56) References Cited

U.S. PATENT DOCUMENTS

| | | | |
|---|---|---|---|
| 6,535,660 B1 * | 3/2003 | Judy | ............................. 385/15 |
| 6,687,441 B1 | 2/2004 | Li | |
| 7,555,187 B2 | 6/2009 | Bickham et al. | |
| 7,929,818 B1 | 4/2011 | Bickham et al. | |
| 2001/0017967 A1 | 8/2001 | Hirano et al. | |
| 2011/0129191 A1 | 6/2011 | Bickham et al. | |

* cited by examiner

OPTICAL FIBER

This application claims the benefit of U.S. Provisional Application No. 61/538,428, filed Sep. 23, 2011, which is incorporated by reference herein in its entirety.

BACKGROUND OF THE INVENTION

1. Field of the Invention

The present invention relates to an optical fiber.

2. Description of the Related Art

In an optical communication system, it is desirable to improve an optical signal-to-noise ratio (OSNR). The improvement in OSNR is particularly important for a communication using a digital coherent detection. By improving OSNR, the capacity of transmission signals can be increased, the transmission distance of the optical communication system can be increased, and the interval between repeaters can be increased. Thus, the performance of the optical communication system can be improved.

To improve OSNR, it is important to reduce the non-linearity of an optical fiber used as an optical transmission line and to reduce the attenuation in the optical transmission line. To reduce the non-linearity generated in the optical fiber, the effective area Aeff of the optical fiber may be increased and the absolute value of chromatic dispersion of the optical fiber may be increased. There is known a non-dispersion shifted optical fiber in which the absolute value of chromatic dispersion is large and the effective area Aeff is increased (for example, International Publication No. 00/062106, Japanese Published Unexamined Patent Application No. 2005-202440, and International Publication No. 2011/066063).

However, the non dispersion shifted optical fiber with the increased effective area Aeff has a large dissimilar splice loss with respect to a standard single mode fiber (SSMF, an effective area Aeff in a wavelength band of 1.55 μm being about 80 μm$^2$) that is the ITU-T G.652 series, a dispersion shifted fiber (DSF, an effective area Aeff in a wavelength band of 1.55 μm being in a range from 50 μm$^2$ to 80 μm$^2$) that is the ITU-T G.653 series, and a non-zero dispersion shifted fiber (NZ-DSF) that is the ITU-T G.655 and G.656 series, these fibers which are already installed as optical transmission lines or used for optical fiber based devices in transmitters, receivers, repeaters and so on. As the result, OSNR may be decreased. A standard optical fiber of the ITU-T G.652 series has optical characteristics, such as a cable cutoff wavelength being 1260 nm or shorter, a nominal value of a mode field diameter (MFD) at a wavelength of 1310 nm being in a range from 8.6 μm to 9.5 μm, a zero-dispersion wavelength being in a range from 1300 nm to 1324 nm, and a dispersion slope at the zero-dispersion wavelength being 0.093 ps/nm$^2$/km or smaller.

U.S. Pat. No. 6,421,489 discloses optical fibers having a large effective area Aeff and a small mode field diameter MFD in Table-I. However, these optical fibers are dispersion shifted fibers with a zero-dispersion wavelength in a range from 1508 nm to 1570 nm. Hence, the optical fibers have a small absolute value of chromatic dispersion, and the non-linear phenomenon likely occurs. Also, these optical fibers are expected to have a high bend loss (more particularly, micro-bend loss). In addition, these optical fibers may have a very long cutoff wavelength of 1857 nm or larger.

U.S. Pat. No. 6,687,441 discloses optical fibers having a large effective area Aeff and a small mode field diameter MFD in Table-I. However, these optical fibers are dispersion shifted fibers with a zero-dispersion wavelength in a range from 1472 nm to 1579 nm. Also, these optical fibers contain a void at the center. Hence, it is expected that the productivity may be not high and the attenuation may be large. In addition, it can be easily expected that the splice loss be increased because the void of these optical fiber is collapsed during fusion splicing with other optical fiber and hence the waveguide structure is changed.

SUMMARY OF THE INVENTION

Accordingly, it is an object of the present invention to provide an optical fiber that is preferably used for an optical transmission line in an optical communication system and that can improve OSNR.

An optical fiber according to a first aspect of the present invention is an optical fiber including a core section and a cladding section. At a wavelength of 1550 nm, a "k value" expressed by k=4Aeff/(πMFD$^2$) is 1.08 or larger where Aeff is an effective area and MFD is a mode field diameter, a chromatic dispersion is +19.0 ps/nm/km or larger and +21.9 ps/nm/km or smaller, and the mode field diameter MFD is 10.3 μm or larger and 13.0 μm or smaller.

In the optical fiber according to the first aspect, the effective area Aeff at the wavelength of 1550 nm may be preferably 100 μm$^2$ or larger. An attenuation at the wavelength of 1550 nm may be preferably 0.19 dB/km or smaller. The core section may be preferably made of silica glass containing a halogen element with an average concentration of 1000 atomic parts per million (ppm) or larger and not containing a typical metal element or a transition metal element as a dopant with an average concentration larger than 0.01 atomic ppm. Also, the core section may preferably contain an alkali metal element with an average concentration in a range from 0.01 atomic ppm to 50 atomic ppm.

In the optical fiber according to the first aspect, a dissimilar splice loss between the optical fiber related to this invention and a standard single mode optical fiber may be preferably 0.4 dB or smaller at the wavelength of 1550 nm. An attenuation at the wavelength of 1550 nm may be preferably 0.19 dB/km or smaller when the optical fiber is wound around the periphery of a mandrel with a diameter of 220 mm, with a winding tension of 0.4 N or larger by a length of 10 km or larger.

Also, R=$r_3/r_2$ may be preferably larger than 1.0 and equal to or smaller than 8.0 where $r_2$ is a radial position at which the refractive index becomes a maximum value $N_2$ in the core section, and $r_3$ is a radius of the core section. The cladding section may preferably include at least a first cladding portion having a refractive index $N_O$ and a second cladding portion arranged at the outer periphery of the first cladding portion and having a refractive index $N_{O2}$, $N_O<N_{O2}$ may be preferably established, and a relative refractive index difference Δd of the second cladding portion with reference to the first cladding portion may be preferably 0.08% or higher.

In the optical fiber according to the first aspect, $r_1<r_2<r_3$ may be preferably established where $r_1$ is a radial position at which a refractive index becomes a minimum value $N_1$ in the core section, R=$r_3/r_2$ may be preferably larger than 1.0 and equal to or smaller than 5.4, and a relative refractive index difference $\Delta_{12}$ of the maximum value $N_2$ with respect to the minimum value $N_1$ of the refractive index in the core section may be preferably 0.05% or higher. (A of the first aspect)

Also, in the optical fiber according to the first aspect, $r_1<r_2<r_3$ may be preferably established, R=$r_3/r_2$ may be preferably larger than 1.0 and equal to or smaller than 6.0, and a relative refractive index difference $\Delta_{12}$ of the maximum value $N_2$ with respect to the minimum value $N_1$ of the refractive index in the core section may be preferably 0.05% or higher.

The relative refractive index difference Δd may be preferably 0.05% or higher. (B of the first aspect)

In the optical fiber according to the first aspect, $R=r_3/r_2$ may be also preferably 1.2 or larger. Also, the relative refractive index difference $\Delta_{12}$ may be also preferably 0.2% or lower.

An optical fiber according to a second aspect of the present invention includes a core section and a cladding section. The inequality, $r_1<r_2<r_3$, is established, $R=r_3/r_2$ is larger than 1.0 and equal to or smaller than 5.4, a relative refractive index difference $\Delta_{12}$ of the maximum value $N_2$ with respect to the minimum value $N_1$ of the refractive index in the core section is in a range from 0.05% to 0.2%, and 4.5 μm≤$r_3$≤7.0 μm is established where $r_1$ is a radial position at which a refractive index becomes a minimum value $N_1$ in the core section, $r_2$ is a radial position at which the refractive index becomes a maximum value $N_2$ in the core section, and $r_3$ is a radius of the core section. A relative refractive index difference $\Delta_{c2}$ of the maximum value $N_2$ with respect to a refractive index $N_O$ at a radial position $r_O$ at a distance that is three times the radius $r_3$ from the center of the core section is 0.25% or higher and 0.55% or lower, and a relative refractive index difference $\Delta_{c1}$ of the minimum value $N_1$ with respect to the refractive index $N_O$ is 0.05% or higher. At a wavelength of 1550 nm, a k value expressed by $k=4Aeff/(\pi MFD^2)$ is 1.08 or larger where Aeff is an effective area and MFD is a mode field diameter, a chromatic dispersion is +19 ps/nm/km or larger, and the mode field diameter MFD is 10.3 μm or larger.

An optical fiber according to a third aspect of the present invention includes a core section and a cladding section. The inequality, $r_1<r_2<r_3$, is established, and $R=r_3/r_2$ is larger than 1.0 and equal to or smaller than 6.0. A relative refractive index difference $\Delta_{12}$ of the maximum value $N_2$ with respect to the minimum value $N_1$ of the refractive index in the core section is in a range from 0.05% to 0.20%. 4.5 μm≤$r_3$≤7.0 μm is established. A relative refractive index difference $\Delta_{c2}$ of the maximum value $N_2$ with respect to a refractive index $N_O$ at a radial position $r_O$ at a distance that is three times the radius $r_3$ from the center of the core section is 0.25% or higher and 0.55% or lower, and a relative refractive index difference $\Delta_{c1}$ of the minimum value $N_1$ with respect to the refractive index $N_O$ is 0.05% or higher. The cladding section includes at least a first cladding portion having the refractive index $N_O$ and a second cladding portion arranged at the outer periphery of the first cladding portion and having a refractive index $N_{O2}$, $N_O<N_{O2}$ is established, and a relative refractive index difference Δd of the second cladding portion with reference to the first cladding portion is 0.05% or higher. At a wavelength of 1550 nm, a k value expressed by $k=4Aeff/(\pi MFD^2)$ is 1.08 or larger, a chromatic dispersion is +19 ps/nm/km or larger, and the mode field diameter MFD is 10.3 μm or larger.

An optical fiber according to a fourth aspect of the present invention includes a core section and a cladding section. The inequality, $r_1<r_2<r_3$, is established, and $R=r_3/r_2$ is larger than 1.0 and equal to or smaller than 8.0. A relative refractive index difference $\Delta_{12}$ of the maximum value $N_2$ with respect to the minimum value $N_1$ of the refractive index in the core section is in a range from 0.05% to 0.20%. 4.5 μm≤$r_3$≤7.0 μm is established. A relative refractive index difference $\Delta_{c2}$ of the maximum value $N_2$ with respect to a refractive index $N_O$ at a radial position $r_O$ at a distance that is three times the radius $r_3$ from the center of the core section is 0.25% or higher and 0.55% or lower, and a relative refractive index difference $\Delta_{c1}$ of the minimum value $N_1$ with respect to a refractive index $N_O$ is 0.05% or higher. The cladding section includes at least a first cladding portion having the refractive index $N_O$ and a second cladding portion arranged at the outer periphery of the first cladding portion and having a refractive index $N_{O2}$, $N_O<N_{O2}$ is established, and a relative refractive index difference Δd of the second cladding portion with reference to the first cladding portion is 0.08% or higher. At a wavelength of 1550 nm, a k value expressed by $k=4Aeff/(\pi MFD^2)$ is 1.08 or larger, a chromatic dispersion is +19 ps/nm/km or larger, and the mode field diameter MFD is 10.3 μm or larger.

In the optical fiber according to the any of the second to fourth aspects, $R=r_3/r_2$ may be also preferably 1.2 or larger.

The optical fiber according to the present invention is preferably used for an optical transmission line in an optical communication system and can improve OSNR.

DESCRIPTION OF THE PREFERRED EMBODIMENTS

An embodiment of the present invention is described below with reference to the accompanying figures. The figures are provided for description and do not intend to limit the scope of the invention. In the figures, the same reference signs refer the same portions to omit redundancy in the description. Relative ratios of dimensions in the figures are not necessarily correct.

An optical fiber according to an embodiment of the present invention is an optical fiber including a core section and a cladding section. At a wavelength of 1550 nm, a k value expressed by $k=4Aeff/(\pi MFD^2)$ is 1.08 or larger where Aeff is an effective area and MFD is a mode field diameter, a chromatic dispersion is +19.0 ps/nm/km or larger and +21.9 ps/nm/km or smaller, and the mode field diameter MFD is 10.3 μm or larger and 13.0 μm or smaller.

If the effective area Aeff is increased to be, for example, 100 μm² or larger at the wavelength of 1550 nm so as to reduce the non-linear phenomenon generated in the optical fiber, the mode field diameter MFD is simultaneously increased. The splice loss between such an optical fiber and SSMF (Aeff being about 80 μm$^2$) may be increased. The intensity of light input into an optical amplifier or an optical receiver is decreased by the amount of splice loss. Hence, OSNR of the optical transmission system may be degraded.

Owing to this, the effective area Aeff of the optical fiber is increased while the mode field diameter MFD is relatively decreased, so that the dissimilar splice loss between this optical fiber and other optical fiber can be decreased. That is to say, the k value expressed by the equation k=4Aeff/(πMFD$^2$) is increased. If the k value is large, even if the mode field diameter MFD is not changed, the effective area Aeff can be increased.

The index profile of the core of SSMF is a stepped shape or a shape of the α-th power with the highest refractive index at the center portion. The SSMF has typically a k value of about 1.0. For example, a SSMF having the core section with a refractive index profile approximated with a parameter α of about 4 exhibits an effective area Aeff of 85 μm$^2$ and a mode field diameter MFD of about 10.5 such that a k value is calculated to be 0.982 at the wavelength of 1550 nm. If the core of an optical fiber has such stepped shape or shape of the α-th power, even the optical fiber has an increased effective area Aeff for suppressing non-linearity, the k value of the optical fiber is almost the same as the SSMF. For example, an optical fiber with a W-shaped structure disclosed in U.S. Pat. No. 7,929,818 has a k value in a range from 0.987 to 1.047. Also, an optical fiber disclosed in U.S. Pat. No. 7,555,187 and having a refractive index trench has a k value in a range from 0.967 to 1.011.

Accordingly, if the k value is 1.08 or larger, even through the mode filed diameter MFD is not changed, the effective area Aeff can be increased by 10% as compared with an optical fiber with a k value of 0.982. Accordingly, the non-linearity of the optical fiber can be efficiently suppressed while the dissimilar splice loss to a SSMF is maintained small. The k value is preferably large, and for example, the k value is more preferably 1.10 or larger.

Figure 1:
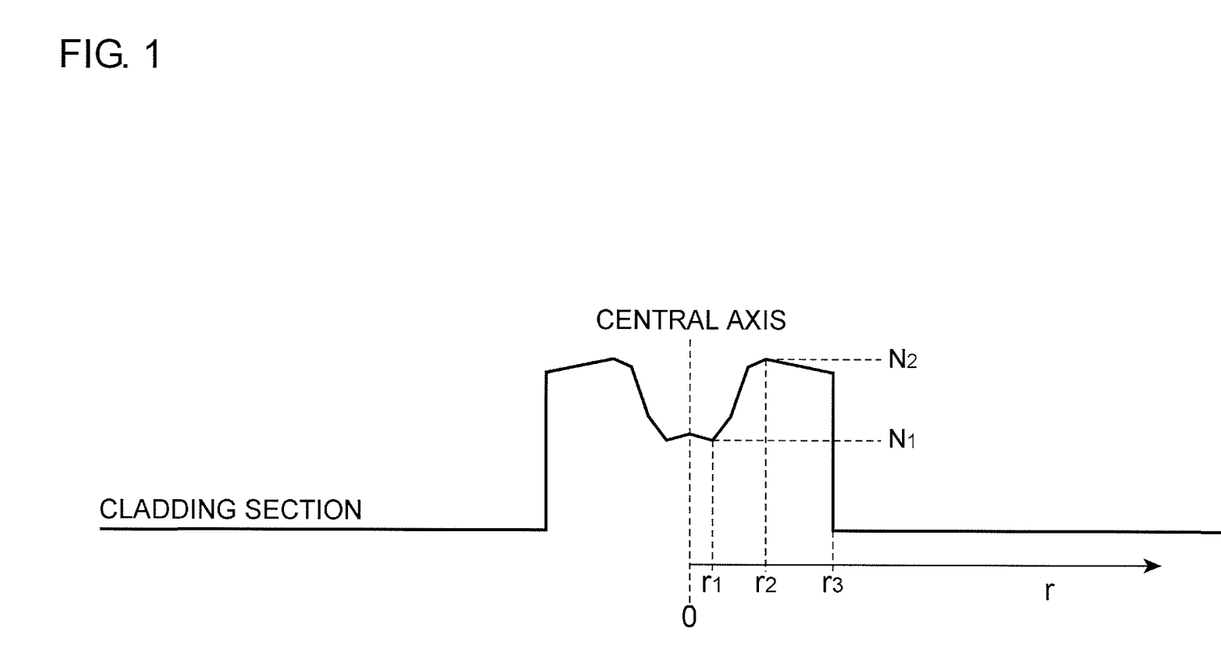
FIG. 1 is a conceptual diagram showing a refractive index profile of an optical fiber.

To achieve an optical fiber with a large k value, the core section of the optical fiber preferably has a refractive index profile as shown in FIG. 1. In particular, let r be a radial distance form the central axis of the core section, $r_1$ be a radial position at which the refractive index becomes a minimum value $N_1$ in the core section, $r_2$ be a radial position at which the refractive index becomes a maximum value $N_2$ in the core section, and $r_3$ be a radius of the core section. Then, $r_1 < r_2 < r_3$ is established. Also, $R = r_3/r_2$ is larger than 1.0 and equal to or smaller than 5.4, and a relative refractive index difference $\Delta_{12}$ of the maximum value $N_2$ with respect to the minimum value $N_1$ of the refractive index in the core section is in a range from 0.05% to 0.2%.

Figure 2:
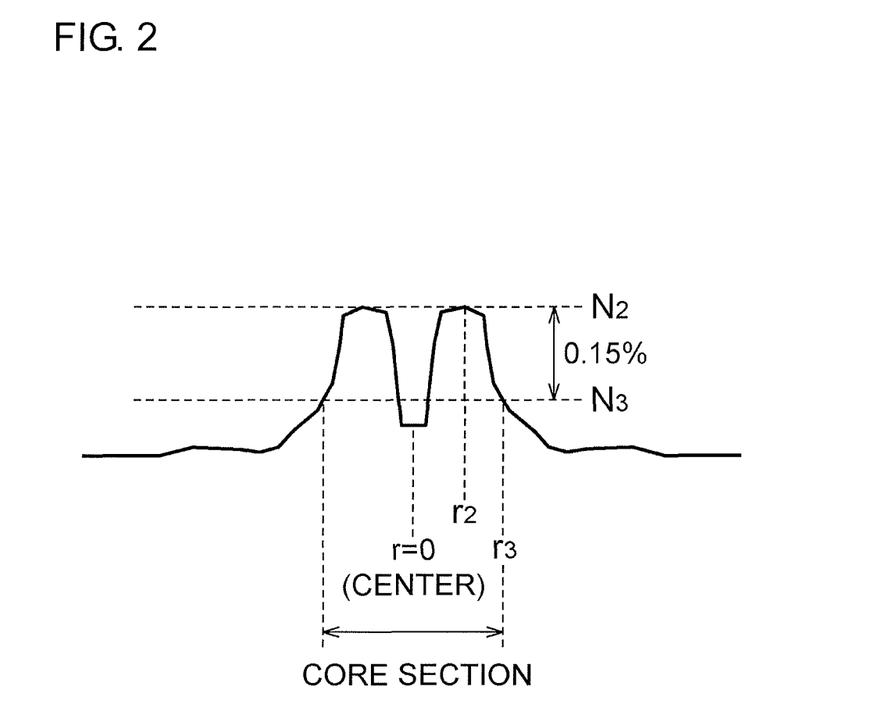
FIG. 2 is a conceptual diagram showing a refractive index profile of an optical fiber.

Herein, as shown in FIG. 2, the radius $r_3$ of the core section represents a position at which, $100 \times (N_2 - N_3)/N_2$ is 0.15% where $N_3$ is a refractive index at the radial position $r_3$. Also, the relative refractive index difference $\Delta_{12}$ of the maximum refractive index $N_2$ with respect to the minimum refractive index $N_1$ is expressed by Eq. 1:

$$\Delta_{12} = 100 \cdot \frac{N_2^2 - N_1^2}{2N_2^2} \approx 100 \cdot \frac{N_2 - N_1}{N_2}. \quad \text{Equation 1}$$

Figure 3:
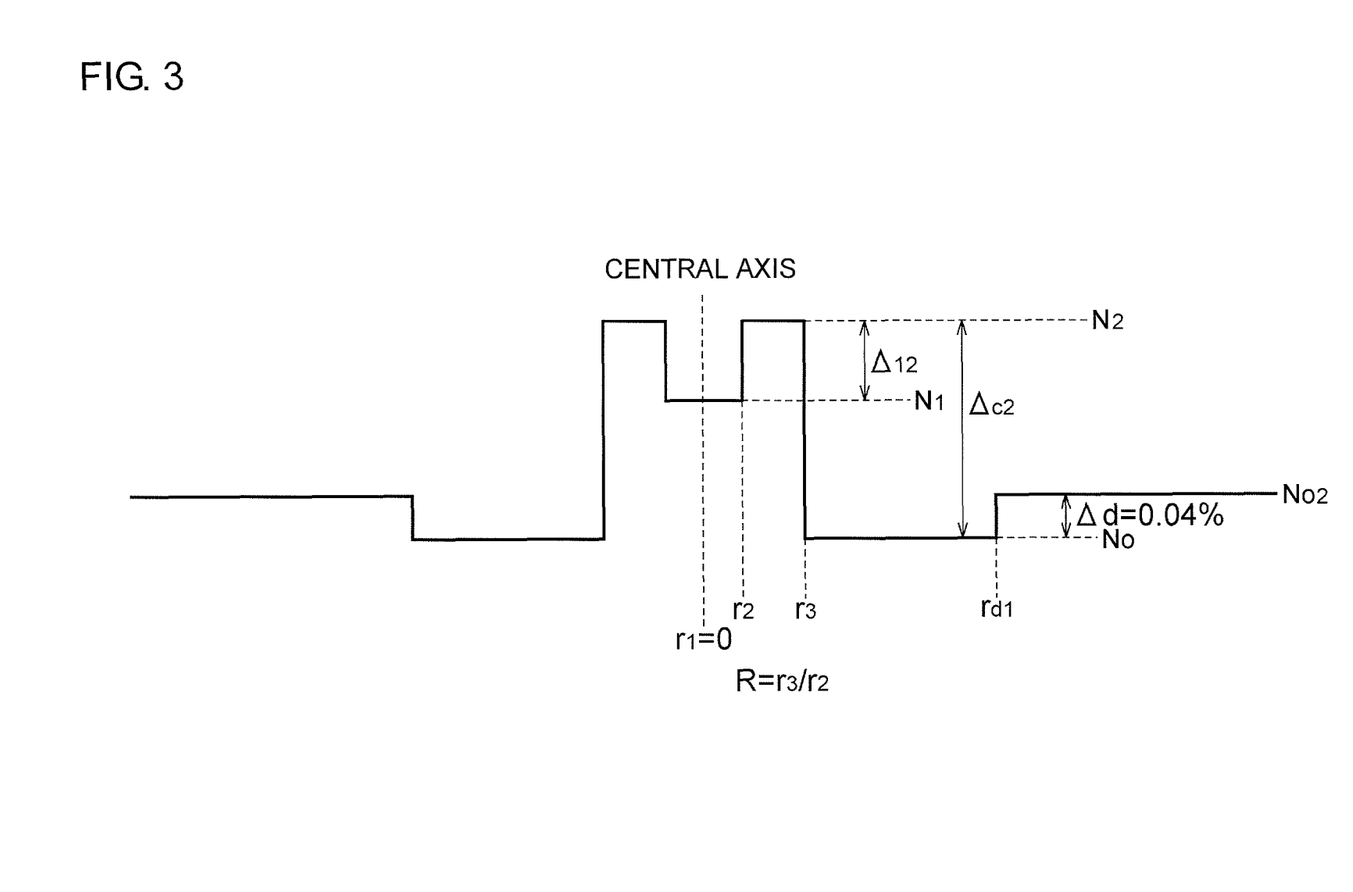
FIG. 3 is a conceptual diagram showing a refractive index profile of an optical fiber.

Next, the ranges of the k value and structural parameters of the optical fiber are described. In this case, numerical calculation was performed for an optical fiber having a refractive index profile as shown in FIG. 3. In this numerical calculation, the optical fiber is made of silica glass, a core section is solid, and each section has a stepped structure. The core section includes a first core portion containing the central axis and having a low refractive index, and a second core portion arranged around the first core portion and having a high refractive index. In the study with reference to FIGS. 4 and 5, it was assumed that $r_1 = 0$ and $r_2$ is a value at the boundary between the first core portion and the second core portion.

The cladding section includes a first cladding portion (outer radius $r_{d1}$) being adjacent to the outer periphery of the core section and having a low refractive index of $N_O$, and a second cladding portion arranged outside the first cladding portion and having a high refractive index of $N_{O2}$. Herein, it is assumed that $\Delta_{c2} = 100 \times (N_2 - N_O)/N_2$ is a relative refractive index difference of the second core portion to the first cladding portion, and a relative refractive index difference of the second cladding portion to the first cladding portion of $\Delta d = 100 \times (N_{O2} - N_O)/N_{O2}$ is 0.04%. Also, it is assumed that the ratio $(r_{d1}/r_3)$ of the outer radius $r_{d1}$ of the first cladding portion to the outer radius $r_3$ of the core section is 3.3. Such an optical fiber was used as a model, and numerical calculation was performed.

Figure 4:
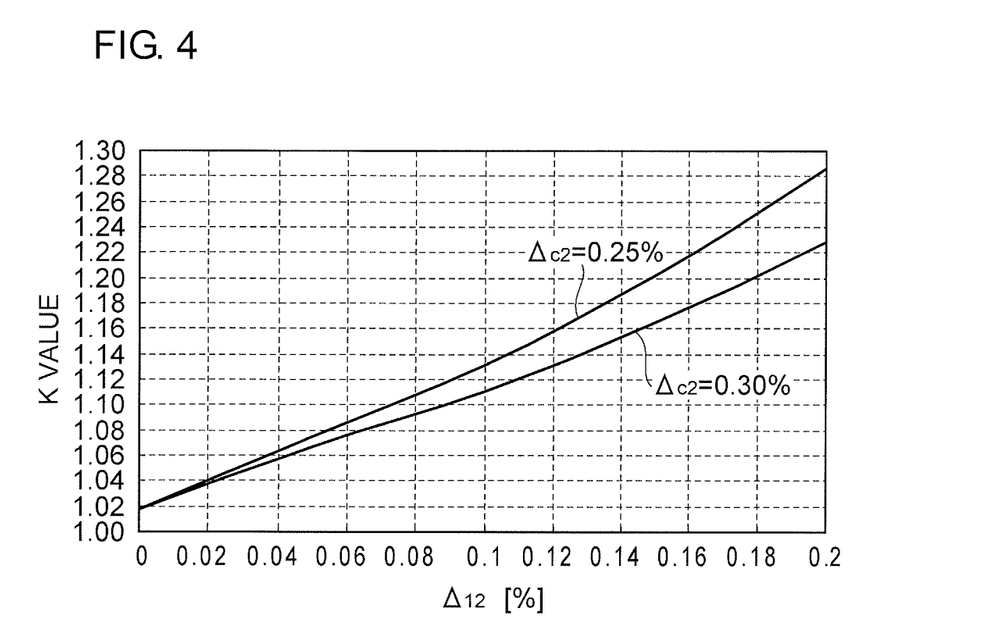
FIG. 4 is a graph showing the relationship between $\Delta_{12}$ and a k value.

FIG. 4 is a graph showing the relationship between $\Delta_{12}$ and a k value. In this case, $\Delta_{c2}$ was 0.25% and 0.30%, $R = r_3/r_2$ was 2.0, and a fiber cutoff wavelength was 1500 nm. If $\Delta_{c2} = 0.25\%$, it is preferable that $\Delta_{12}$ is 0.05% or higher because the k value becomes 1.08 or larger. Also, if $\Delta_{12}$ is 0.07% or higher, the k value becomes 1.10 or larger. If $\Delta_{12}$ is 0.11% or higher, the k value becomes 1.15 or larger. These cases are more preferable. If $\Delta_{c2} = 0.30\%$, the k value becomes 1.07 or larger as far as $\Delta_{12}$ is 0.05% or higher. It is preferable that $\Delta_{12}$ is 0.07% or higher because the k value becomes 1.08 or larger. If $\Delta_{12}$ is 0.11% or higher, it is more preferable because the k value becomes 1.12 or larger. Also, if there is a large refractive index dip around the center of the core section, an attenuation may be increased due to a large refractive index mismatching in the core area. Hence, $\Delta_{12}$ is preferably 0.2% or lower, and the core section preferably has a higher refractive index than that of the second cladding portion. Also, if $\Delta_{12}$ is 0.2% or lower, and $\Delta_{c2}$ is 0.25%, the maximum k value becomes 1.29.

Figure 5:
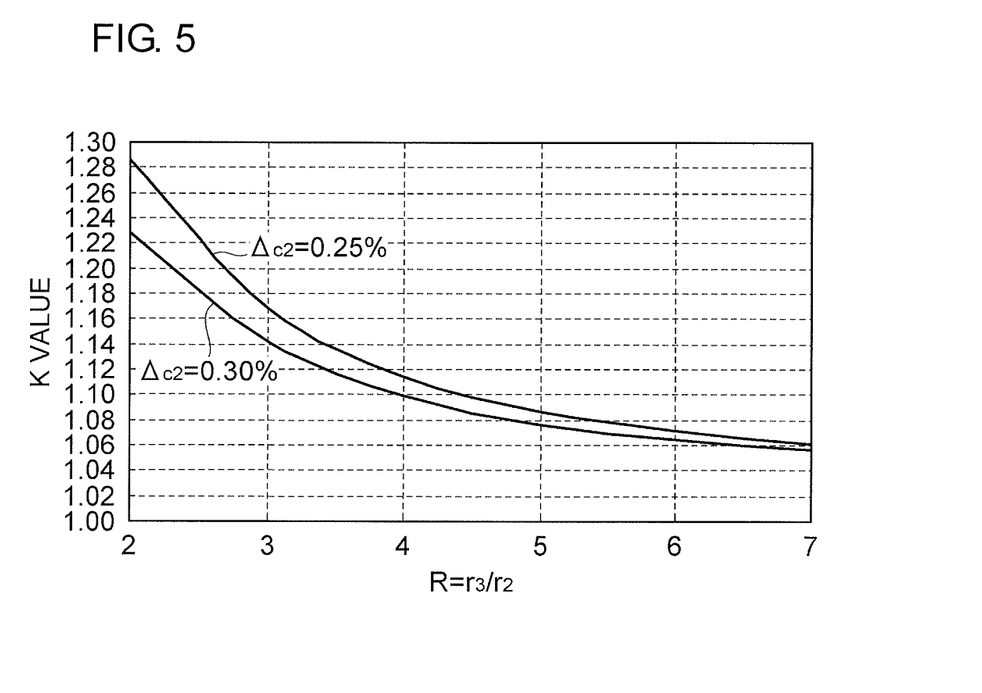
FIG. 5 is a graph showing the relationship between $R=r_3/r_2$ and a k value.

FIG. 5 is a graph showing the relationship between $R = r_3/r_2$ and a k value. In this case, $\Delta_{c2}$ was 0.25% and 0.30%, $\Delta_{12}$ was 0.20%, and a fiber cutoff wavelength was 1500 nm. If $\Delta_{c2} = 0.25\%$, it is preferable that R is 5.4 or smaller because the k value becomes 1.08 or larger. Also, if R is 4.4 or smaller, the k value becomes 1.10 or larger. If R is 3.2 or smaller, the k value becomes 1.15 or larger. These cases are more preferable. If $\Delta_{c2} = 0.30\%$, it is preferable that R is 5.4 or smaller because the k value becomes 1.07 or larger. Also, it is preferable that R is 4.4 or smaller because the k value becomes 1.09 or larger. Further, if R is 3.2 or smaller, it is more preferable because the k value becomes 1.13 or larger.

Figure 11:
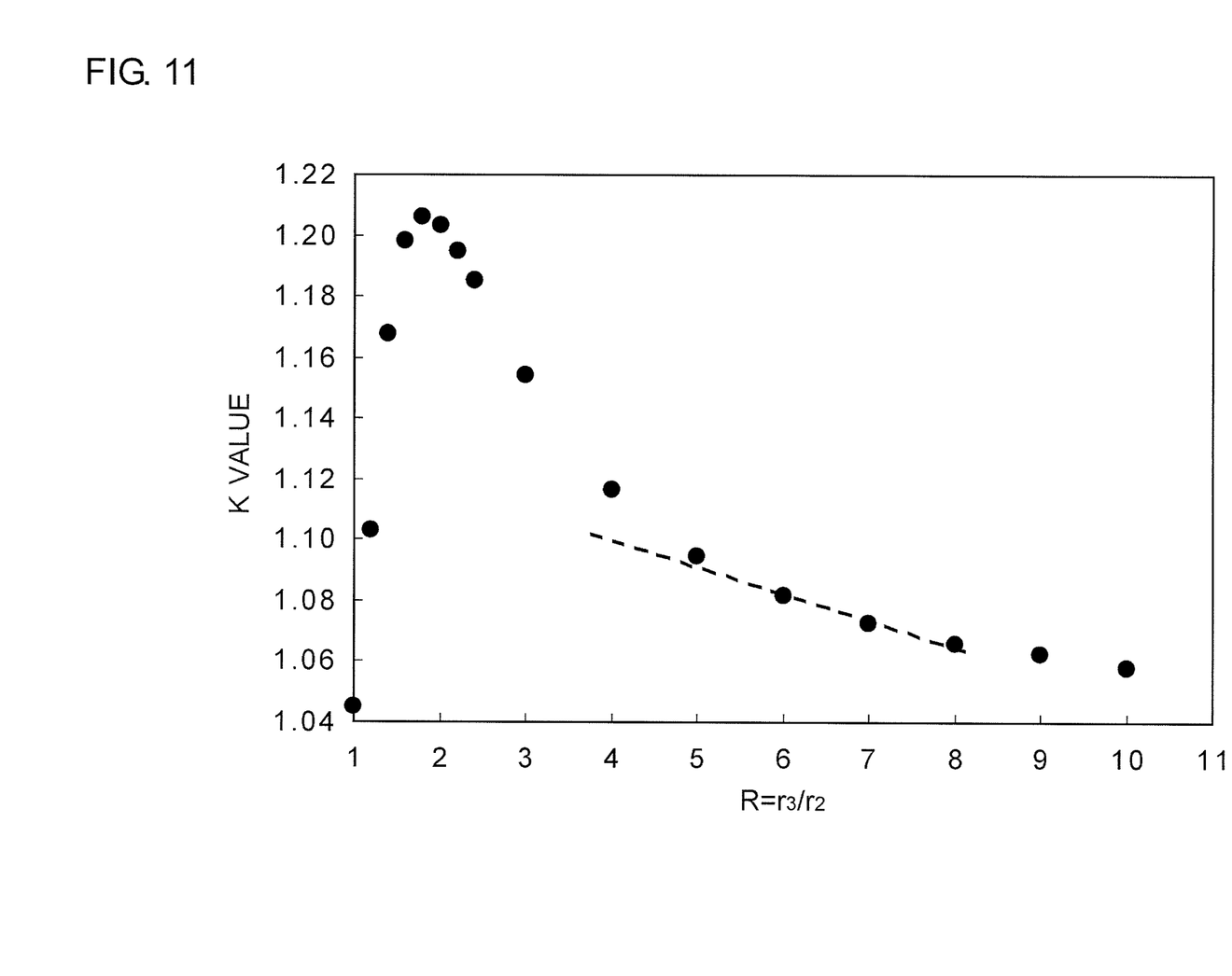
FIG. 11 is a graph showing the relationship between $R=r_3/r_2$ and a k value.
Figure 12:
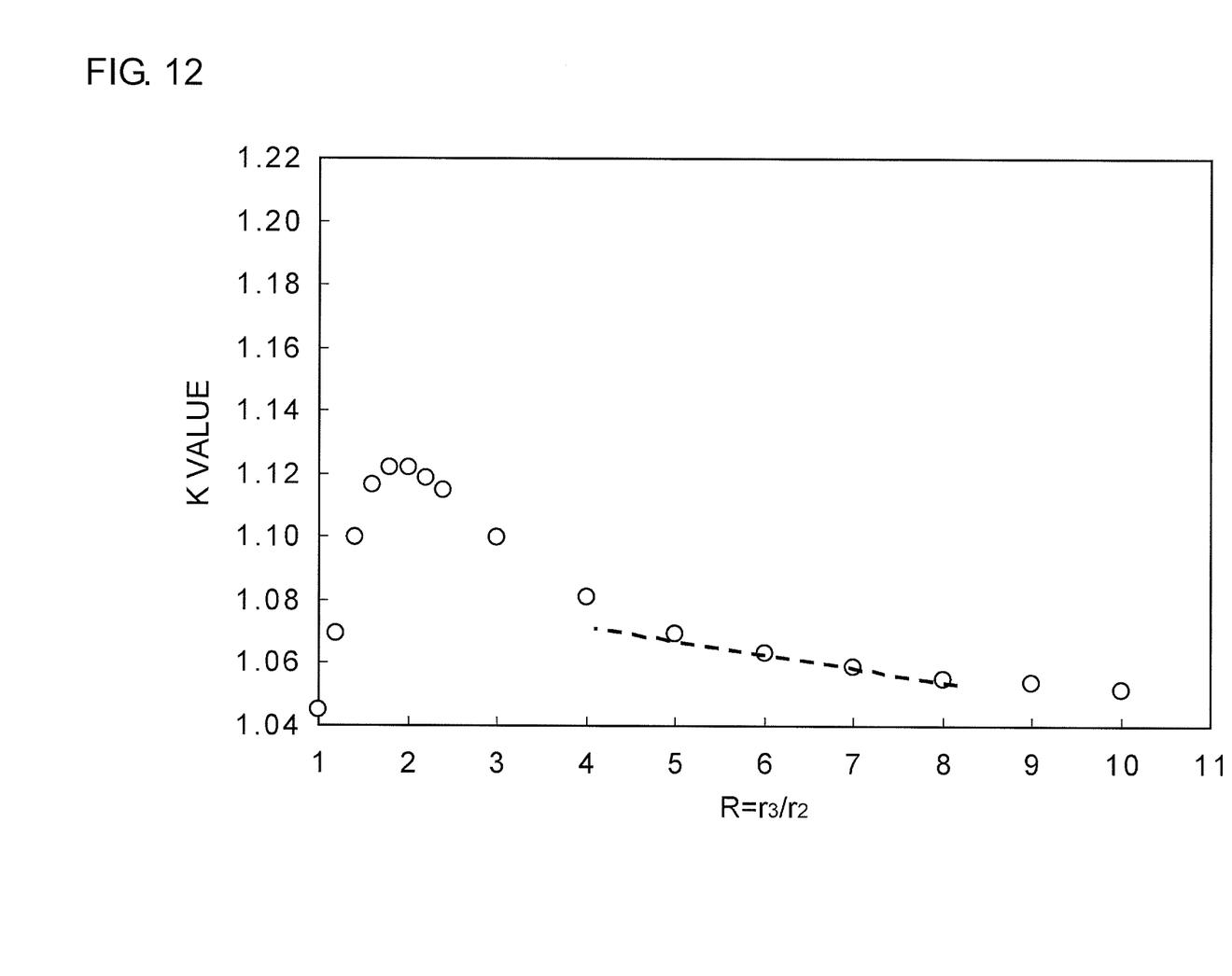
FIG. 12 is a graph showing the relationship between $R=r_3/r_2$ and a k value.

FIGS. 11 and 12 are graphs each showing the relationship between $R = r_3/r_2$ and a k value. In FIG. 11, $\Delta_{12}$ is 0.20%. In FIG. 12, $\Delta_{12}$ is 0.10%. Also, in either case, $\Delta_{c2}$ was determined so that the fiber cutoff wavelength became 1500 nm and Aeff at the wavelength of 1550 nm became 135 μm$^2$ when $\Delta d = 0.10\%$ and $r_{d1}/r_3 = 3.3$. It is to be noted that when R=1, the core section has a stepped shape without a dip at the center of the core. As shown in FIG. 11, when $R = r_3/r_2$ is in a range from about 1.3 to 4.0, it is particularly preferable because the k value becomes markedly large as compared with a case in which R is in a range from 1 to 1.3 and in a range of 5.0 or larger. In the case of FIG. 12, as compared with FIG. 11, the k value is decreased. However, it is preferable that R is in a range from about 1.3 to 4.0 like the case in FIG. 11 because the k value becomes markedly large as compared with the case in which R is in the range from 1 to 1.3 and in the range of 5.0 or larger.

Also, Table I shows the relationship among $R=r_3/r_2$, a radius $r_3$ of the core section, $\Delta_{c2}$, and MFD at the wavelength of 1550 nm when Aeff=135 μm². Table I represents the graphs in FIGS. 11 and 12.

TABLE I

| $R = r_3/r_2$ | $\Delta_{12}$ % | Aeff μm² | MFD μm | k Value | $\Delta_{c2}$ % | $r_3$ μm |
|---|---|---|---|---|---|---|
| 1 | — | 135 | 12.8 | 1.05 | 0.281 | 6.63 |
| 1.2 | 0.2 | 135 | 12.5 | 1.10 | 0.487 | 5.96 |
| 1.4 | 0.2 | 135 | 12.1 | 1.17 | 0.467 | 5.74 |
| 1.6 | 0.2 | 135 | 12.0 | 1.20 | 0.441 | 5.71 |
| 1.8 | 0.2 | 135 | 11.9 | 1.21 | 0.420 | 5.74 |
| 2.0 | 0.2 | 135 | 12.0 | 1.20 | 0.406 | 5.79 |
| 2.2 | 0.2 | 135 | 12.0 | 1.20 | 0.385 | 5.85 |
| 2.4 | 0.2 | 135 | 12.0 | 1.19 | 0.374 | 5.90 |
| 3.0 | 0.2 | 135 | 12.2 | 1.15 | 0.350 | 6.05 |
| 4.0 | 0.2 | 135 | 12.4 | 1.18 | 0.324 | 6.23 |
| 5.0 | 0.2 | 135 | 12.5 | 1.09 | 0.310 | 6.34 |
| 6.0 | 0.2 | 135 | 12.6 | 1.08 | 0.303 | 6.40 |
| 7.0 | 0.2 | 135 | 12.7 | 1.07 | 0.297 | 6.45 |
| 8.0 | 0.2 | 135 | 12.7 | 1.07 | 0.293 | 6.49 |
| 9.0 | 0.2 | 135 | 12.7 | 1.06 | 0.292 | 6.51 |
| 10.0 | 0.2 | 135 | 12.7 | 1.06 | 0.289 | 6.54 |
| 1.2 | 0.1 | 135 | 12.7 | 1.07 | 0.388 | 6.26 |
| 1.4 | 0.1 | 135 | 12.5 | 1.10 | 0.380 | 6.10 |
| 1.6 | 0.1 | 135 | 12.4 | 1.12 | 0.370 | 6.06 |
| 1.8 | 0.1 | 135 | 12.4 | 1.12 | 0.360 | 6.07 |
| 2.0 | 0.1 | 135 | 12.4 | 1.12 | 0.352 | 6.10 |
| 2.2 | 0.1 | 135 | 12.4 | 1.12 | 0.344 | 6.13 |
| 2.4 | 0.1 | 135 | 12.4 | 1.11 | 0.339 | 6.17 |
| 3.0 | 0.1 | 135 | 12.5 | 1.10 | 0.320 | 6.27 |
| 4.0 | 0.1 | 135 | 12.6 | 1.08 | 0.305 | 6.40 |
| 5.0 | 0.1 | 135 | 12.7 | 1.07 | 0.297 | 6.46 |
| 6.0 | 0.1 | 135 | 12.7 | 1.06 | 0.293 | 6.50 |
| 7.0 | 0.1 | 135 | 12.7 | 1.06 | 0.290 | 6.53 |
| 8.0 | 0.1 | 135 | 12.8 | 1.06 | 0.288 | 6.55 |
| 9.0 | 0.1 | 135 | 12.8 | 1.05 | 0.287 | 6.56 |
| 10.0 | 0.1 | 135 | 12.8 | 1.05 | 0.285 | 6.58 |

Figure 13:
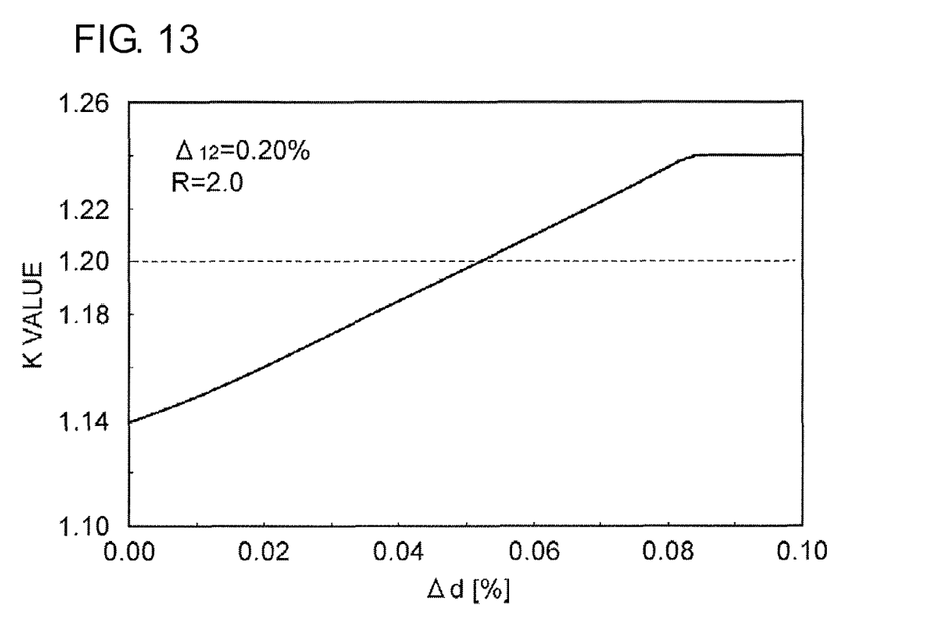
FIG. 13 is a graph showing the relationship between Δd and a k value.

As shown in FIGS. 11 and 12, the k value becomes the maximum when R is around 2. Regarding the optical fiber having the refractive index profile shown in FIG. 3, FIG. 13 shows the relationship between a relative refractive index difference Δd of the second cladding portion with reference to the refractive index of the first cladding portion and a k value when R=2. At this time, $r_{d1}/r_3=3.5$, $\Delta_{12}$ was 0.20%, the cable cutoff wavelength was 1500 nm (the fiber cutoff wavelength was about 1620 nm), and Aeff at the wavelength of 1550 nm was 143 μm². As shown in FIG. 13, in either case, the k value is 1.10 or larger. Also, when Δd is about 0.05% or higher, it is particularly preferable because the k value becomes 1.20 or larger. Also, if Δd is about 0.08% or higher, it is markedly preferable because the k value becomes a substantially constant value that is as very large as about 1.24.

Figure 14:
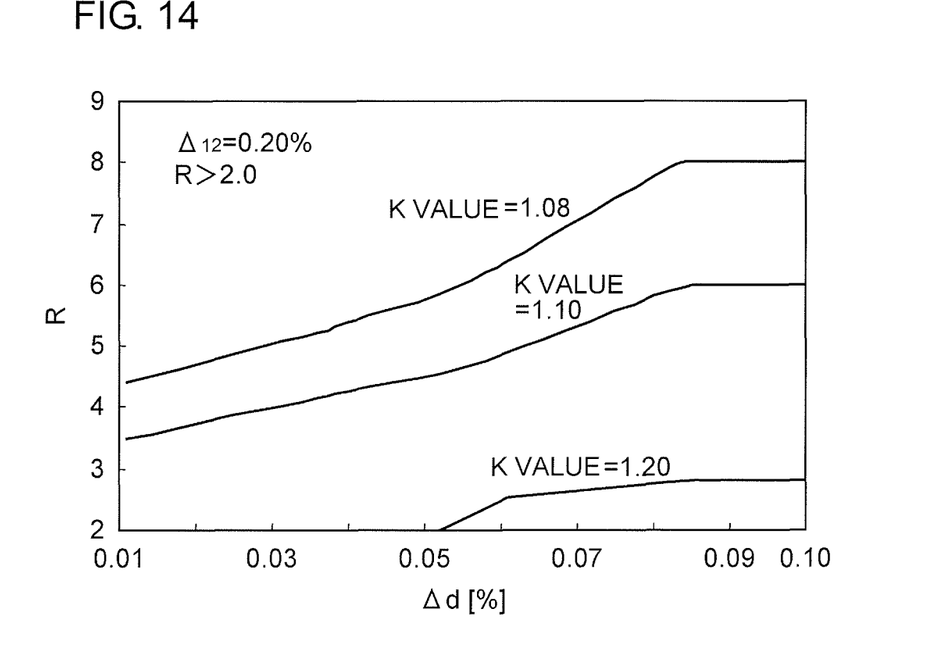
FIG. 14 is a graph showing the contour line of k-values with respect to Δd and R.

If R is about 2 or larger, the larger the R value, the smaller the k value. FIG. 14 shows the relationship between Δd and $R=r_3/r_2$ when the k value is 1.08, 1.10, or 1.20. Herein, R is larger than 2. At this time, like the case in FIG. 13, $r_{d1}/r_3=3.5$, $\Delta_{12}$ was 0.20%, the cable cutoff wavelength was 1500 nm (the fiber cutoff wavelength was about 1620 nm), and Aeff at the wavelength of 1550 nm was 143 μm². As Δd becomes small, value of R with which the k value becomes larger is decreased. For example, when Δd=0.04%, if R is 5.4 or smaller, the k value may become 1.08 or larger. Also, when Δd is 0.05% or higher, it is preferable that R is 6 or smaller because the k value may become 1.08 or larger. In particular, when Δd is 0.05% or higher, if R is 2 or larger and 3 or smaller, it is further preferable because the k value may become 1.20 or larger. The ratio $r_{d1}/r_3$ is preferably in a range from 2.5 to 4.0, because as far as the ratio $r_{d1}/r_3$ is in the range, there is no significant difference in attenuation property as compared with the attenuation property at $r_{d1}/r_3=3.5$ which is shown in FIGS. 13 and 14.

Next, the upper limit of the mode field diameter MFD of the optical fiber is described. Let $W_1$ be a mode field diameter MFD of a first optical fiber, $W_2$ be a mode field diameter MFD of a second optical fiber, a dissimilar splice loss of the fusion spliced first and second optical fibers possibly caused by mismatching of the mode field diameters MFD of both the optical fibers can be estimated by Eq. 2:

$$\text{splice loss} = 10 \cdot \log\left[\left(\frac{2W_1 W_2}{W_1^2 + W_2^2}\right)^2\right]. \qquad \text{Equation 2}$$

Hence, if two optical fibers are connected by fusion splicing, the larger the difference between the mode filed diameters MFDs of both the optical fibers, the larger the dissimilar splice loss.

Figure 6:
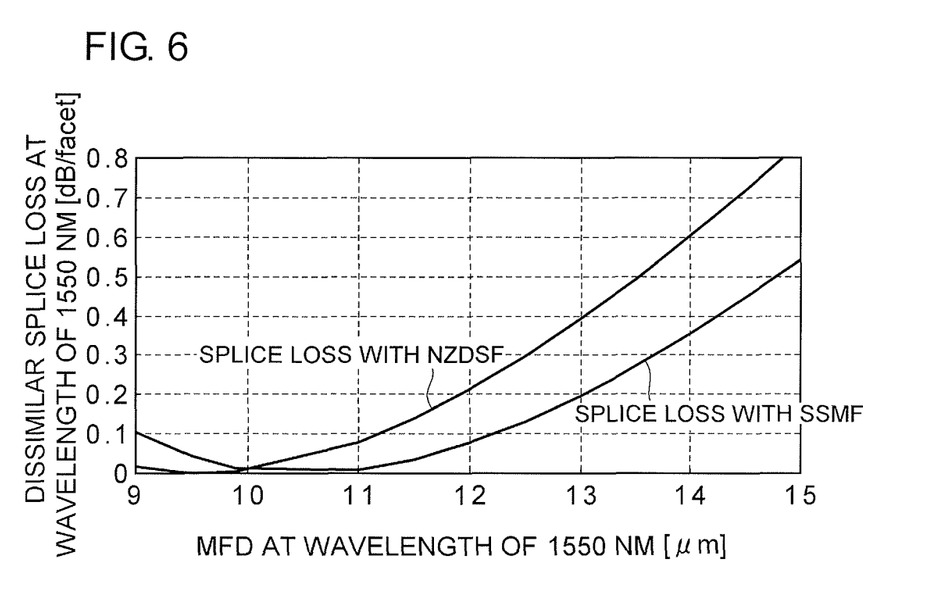
FIG. 6 is a graph showing the relationship between a mode field diameter MFD and a dissimilar splice loss of an optical fiber with respect to a standard SMF and a non-zero dispersion shifted fiber.

FIG. 6 is a graph showing the relationship between a mode field diameter MFD and a splice loss of each optical fiber. In this case, second optical fiber was a SSMF (Aeff=85 μm², k value=0.982) with a mode field diameter MFD of 10.5 μm at a wavelength of 1550 nm, or a NZ-DSF (Aeff=71 μm², k value=0.981) with a mode filed diameter MFD of 9.6 μm at a wavelength of 1550 nm. Then, the dissimilar splice loss was calculated with Eq. 2 for the first optical fiber having each value of mode field diameters MFD.

The splice loss is preferably small. For example, the splice loss is preferably 0.4 dB/facet or smaller. In actual splicing, in addition to the splice loss caused by mismatching between the mode field diameters MFD expressed by Eq. 2, splice losses caused by misalignment of core axes of both the optical fibers and caused by axial curvature at end faces of both the optical fibers are generated. As the result, the entire splice loss may become larger than the value obtained by Eq. 2 by about 0.2 dB. Therefore, the splice loss calculated based on the mismatching between the mode field diameters MFD of both the optical fibers is desirably 0.2 dB/facet or smaller. Regarding fusion splicing with SSMF, the mode field diameter MFD at the wavelength of 1550 nm is preferably 13 μm or smaller. Also, regarding fusion splicing with NZ-DSF with a smaller mode field diameter MFD, the mode field diameter MFD at the wavelength of 1550 nm is further preferably 12 μm or smaller.

The larger the mode field diameter MFD, the larger the effective area Aeff. It is preferable because the non-linear phenomenon can be suppressed. If the k value is 1.21, the effective area Aeff is 100 μm² or larger as far as the mode filed diameter MFD is 10.3 μm or larger. Hence, the mode field diameter MFD is preferably 10.3 μm or larger. The effective area Aeff at the wavelength of 1550 nm is further preferably 110 μm² or larger (the mode field diameter MFD is 10.8 μm or larger). The effective area Aeff is the most preferably 120 μm² or larger (the mode field diameter MFD is 11.3 μm or larger).

Figure 7:
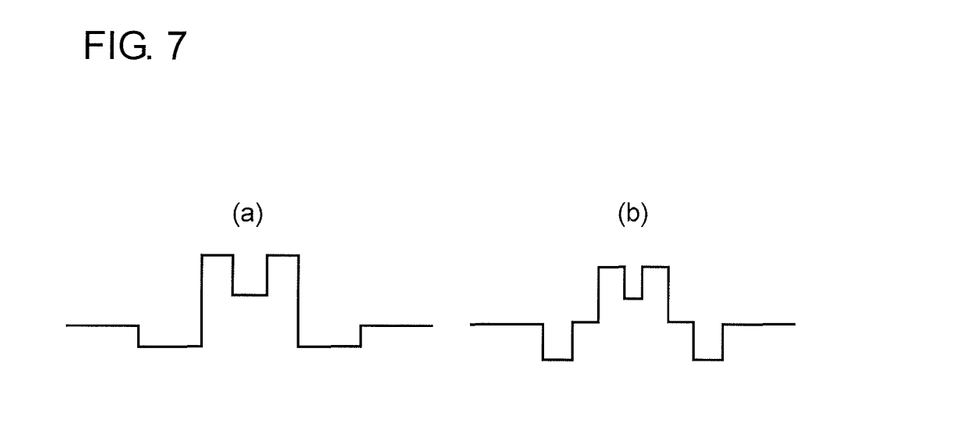
FIGS. 7A and 7B are conceptual diagrams showing refractive index profiles of optical fibers.

Also, the optical fiber with the increased effective area Aeff may have a degraded bend loss. For example, if a region with a low refractive index is provided around the outer periphery of the core section as shown in FIGS. 7A and 7B, the bend loss can be decreased.

Next, the macro-bend loss of the optical fiber is described. The macro-bend loss of the optical fiber is preferably small. For example, if the optical fiber is wound with a diameter of 20 mm, the macro-bend loss at the wavelength of 1550 nm may be 100 dB/m or smaller, preferably 20 dB/m or smaller, or further preferably 10 dB/m or smaller. If the optical fiber is wound with a diameter of 30 mm, the macro-bend loss is decreased. With a diameter of 30 mm, the macro-bend loss at the wavelength of 1550 nm be 10 dB/m or smaller, preferably 2 dB/m or smaller, or further preferably 1 dB/m or smaller. In addition, if the optical fiber is wound with a diameter of 60 mm, the bend loss at the wavelength of 1625 nm be 0.01 dB/m or smaller, preferably 0.005 dB/m or smaller, or further preferably 0.002 dB/m or smaller.

Also, when the effective area Aeff is increased, the micro-bend loss is increased. The outer periphery of a cladding glass section of a transmission optical fiber is typically coated with two-layer-structure coating resins. In general, an optical fiber, in which an inner primary coating resin of the two-layer structure has a lower Young's modulus and an outer secondary coating resin of the two-layer structure has a higher Young's modulus, has a low micro-bend loss. More specifically, the Young's modulus of the primary coating resin be selected from a range from 0.2 MPa to 2 MPa, or preferably a range from 0.2 MPa to 1 MPa, and the Young's modulus of the secondary coating resin be selected from a range from 500 MPa to 2000 MPa, or more preferably a range from 1000 MPa to 2000 MPa. In addition, if a glass transition point of the primary coating resin is low, the Young's modulus is not increased even at low temperatures, resulting in that an increase in attenuation of the optical fiber at low temperatures becomes small. The glass transition point of the primary coating resin is preferably lower than the temperature of an actual use environment, and more particularly, the glass transition point is preferably −30° C. or lower. Also, the glass transition point is further preferably −50° C. or lower. The glass transition point of the secondary coating resin may be 70° C. or higher.

Also, means for decreasing the micro-bend loss may be a method of increasing the cladding glass diameter of the optical fiber or the outer diameter of the coating resin. Either method is preferable. However, such an optical fiber is not practical because the difference in the diameters is increased with respect to a typically used optical fiber (a glass diameter of 125 μm, a coating outer diameter of 245 μm). The outer diameter of the cladding glass be in a range from 123 μm to 127 μm, and the outer diameter of the coating resin be in a range from 230 μm to 260 μm. In addition, an increase in attenuation caused by the micro-bend loss at the wavelength of 1550 nm be 1 dB/km or smaller (substantially equivalent to NZ-DSF for a submarine cable in actual use), preferably 0.6 dB/km or smaller (substantially equivalent to a non-zero dispersion shifted fiber for a submarine cable in actual use), or further preferably 0.3 dB/km or smaller (substantially equivalent to SSMF). In this case, the micro-bend loss is expressed by an increase in attenuation when an optical fiber is wound around a bobbin with a diameter of 400 mm, the surface of which is covered with a wire mesh with a diameter of 50 μm at an interval of 100 μm, with a winding tension of 0.8 N.

If the diameter of a mandrel of a bobbin around which an optical fiber is wound and spooled is large, a bend applied to the optical fiber is small. Thus, the attenuation when the optical fiber is wound is small. However, it is not preferable because the size of bobbin becomes too large. When such an optical fiber is wound on a mandrel with a diameter of 220 mm with a winding tension of 0.4 N or larger (a tension not causing a defect such as failure in winding condition during transportation) by a length of 10 km or larger, the attenuation at the wavelength of 1550 nm be 0.19 dB/km or smaller, preferably 0.18 dB/km or smaller, or further preferably 0.17 dB/km or smaller. As described above, the attenuation can be guaranteed as the actual value without increment due to winding on a mandrel in the state in which the long optical fiber is wound around the bobbin. Also, the diameter of the mandrel is preferably 150 mm or larger because an excessive bend loss is not generated.

Next, other characteristic and structure of an optical fiber are described. To suppress generation of the non-linear phenomenon in the optical fiber, chromatic dispersion of the optical fiber is preferably large. Particularly when wavelength division multiplexing (WDM) transmission is performed in an optical communication system, the non-linear phenomenon can be suppressed with reduction in pulse-pulse interference because a delay time difference is generated between different signal light wavelengths when signal light propagates through an optical fiber transmission line and with reduction in peak power because signal light pulses are spread on the time axis by a large chromatic dispersion (for example, see V. Curri, et al., IEEE Photon. Technol. Lett., vol. 22, No. 19, pp. 1446-1448, 2010).

SSMF has chromatic dispersion about +17 ps/nm/km at the wavelength of 1550 nm. Hence, chromatic dispersion at the wavelength of 1550 nm is preferably +19 ps/nm/km or larger that is larger by 10% or more. Also, since the optical fiber consists of silica-based glass, the chromatic dispersion at the wavelength of 1550 nm is preferably equivalent to or smaller than material dispersion of silica glass, i.e., +21.9 ps/nm/km or smaller. Also, the dispersion slope at the wavelength of 1550 nm is preferably +0.050 ps/nm$^2$/km or larger and +0.070 ps/nm$^2$/km or smaller.

When the cladding section serves as the reference refractive index (if the cladding section has a multi-layer structure, a refractive index at a radial position at a distance that is three times the radius $r_3$ of the core section serves as the reference), the relative refractive index difference $\Delta_{c2}$ of the maximum value of the refractive index in the core section is preferably in a range from 0.25% to 0.55%. The radius $r_3$ of the core section is preferably 4.5 μm or larger and 7.0 μm or smaller. Within these ranges, it can be satisfied that the mode filed diameter MFD is in the range from 10.3 μm to 13.0 μm and the chromatic dispersion is in the range from +19.0 ps/nm/km to +21.9 ps/nm/km at the wavelength of 1550 nm.

The smaller the attenuation, the more the OSNR is improved. Accordingly, the attenuation at the wavelength of 1550 nm is preferably lower than 0.19 dB/km, further preferably 0.18 dB/km or smaller, or the most preferably 0.17 dB/km or smaller.

The core section of the optical fiber may be silica glass doped with $GeO_2$. In this case, the attenuation is in a range from about 0.175 dB/km to 0.19 dB/km. More preferably, the core section of the optical fiber is made of substantially pure silica glass, doped with only a halogen element, such as chlorine (Cl) and/or fluorine (F), and not containing a typical metal element, such as germanium (Ge) or aluminum (Al), and a transition metal element, such as nickel (Ni) or copper (Cu), with a concentration larger than 0.01 atomic parts per million (ppm). Also, an alkali metal element, such as potassium (K), sodium (Na), and/or rubidium (Rb), is preferably doped in the core section by an average concentration of 0.01 atomic ppm to 50 atomic ppm. In this case, the attenuation can be decreased to a value in a range from 0.15 dB/km to 0.18 dB/km.

In addition, in the case of a pure silica core fiber including a core section substantially made of pure silica, the core section has a third-order non-linear refractive index n2 becomes $2.2 \times 10^{-20}$ m$^2$/W or smaller that is lower than a core doped with $GeO_2$, by 5% to 10%. Hence, such a pure silica core fiber is preferable. Herein, n2 is an effective value when the state of the polarization is random. (If the fiber is long enough, for example, the length is several kilometers or larger, the two orthogonal polarization modes of incident lightwave propagating in the fiber are randomly coupled with each other, and therefore, state of polarization becomes random.) More specifically, the n2 value of the pure silica core fiber is about $2.18 \times 10^{-20}$ m$^2$/W.

Figure 8:
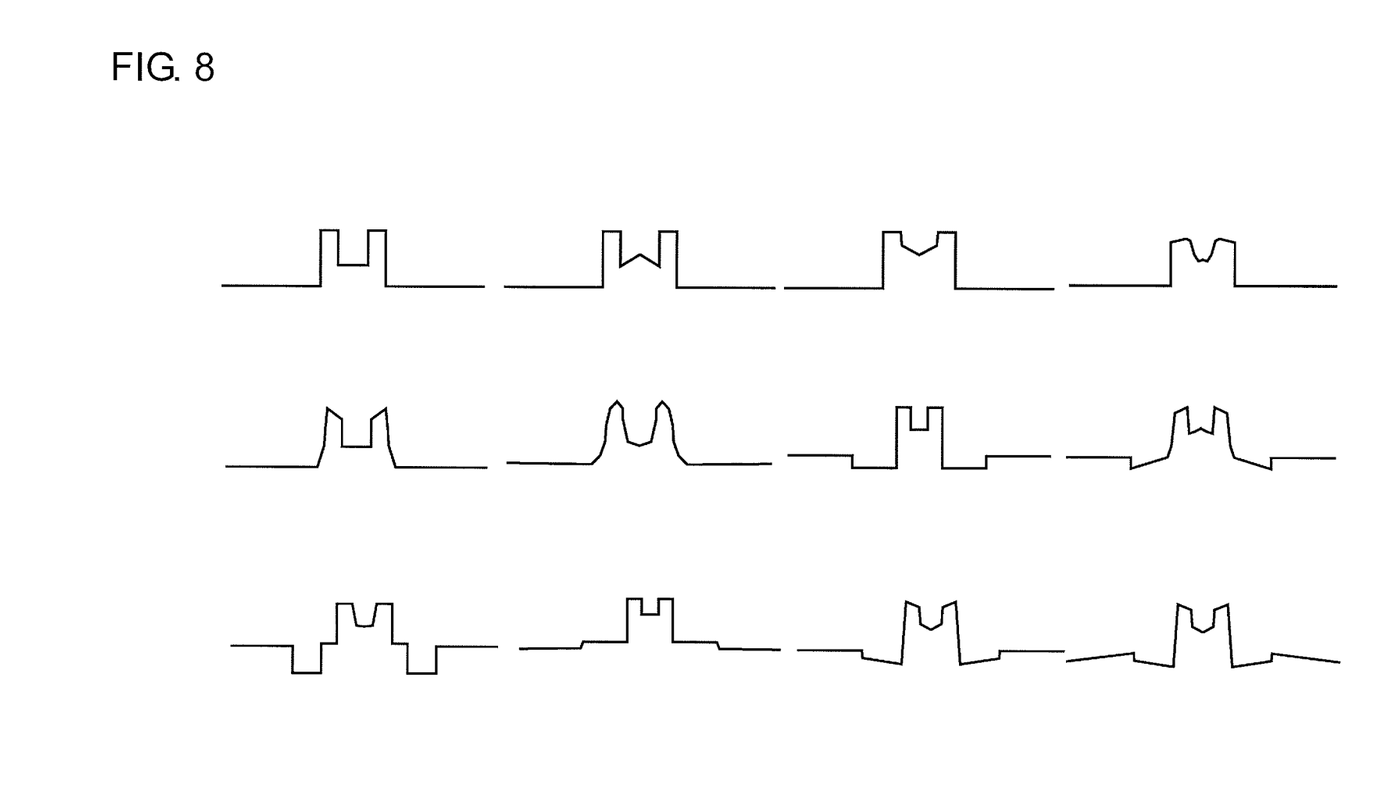
FIG. 8 is a conceptual diagram showing a refractive index profile of an optical fiber.

The attenuation at a wavelength of 1380 nm is, for example, preferably 0.8 dB/km or smaller, further preferably 0.4 dB/km or smaller, or the most preferably 0.3 dB/km or smaller. The polarization mode dispersion may be 0.2 ps/√km or smaller. The cable cutoff wavelength is preferably 1520 nm or smaller, or further preferably 1450 nm or smaller that is a pump wavelength used for Raman amplification. The core section and the cladding section of the optical fiber may each have a refractive index structure, and may have, for example, a profile schematically shown in FIGS. 7 and 8. However, it is not limited thereto.

The optical fiber according to the embodiment of the present invention has a small non-linearity, a low attenuation, and a small dissimilar splice loss. The optical transmission system constructed by the optical fiber can increase OSNR, and improve the transmission performance.

EXAMPLES

Next, Examples 1 to 10 of optical fibers according to the present invention are described. Any of the optical fibers of Examples 1 to 10 is made of silica-based glass and was manufactured by a known method.

Figure 9:
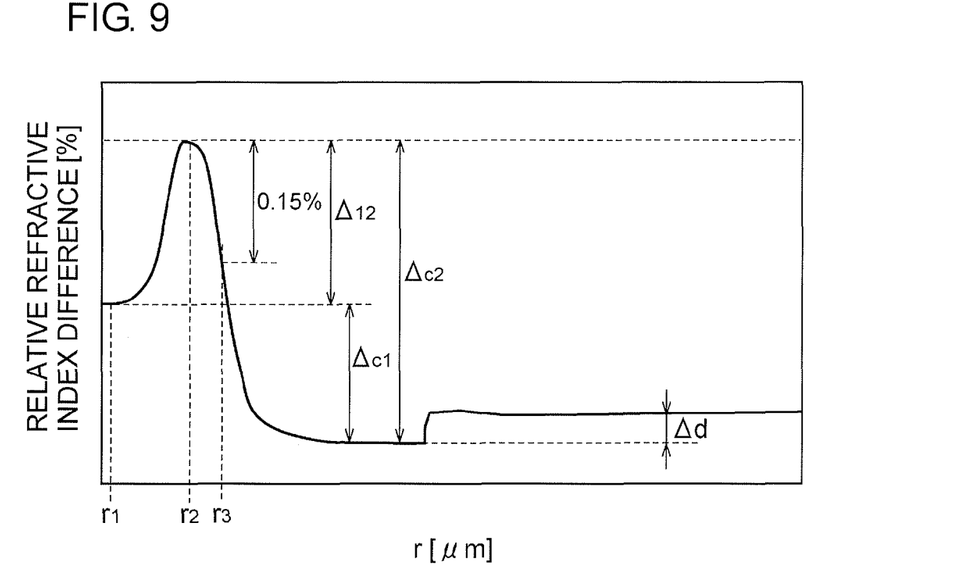
FIG. 9 is a conceptual diagram showing a refractive index profile of each of optical fibers according to Examples 1 to 5.

FIG. 9 is an illustration schematically showing a refractive index profile of each of the optical fibers according to Examples 1 to 5. In each of the optical fibers according to Examples 1 to 5, a core section included a first core portion with a low refractive index and a second core portion with a high refractive index. Chlorine, fluorine, and low-concentration GeO$_2$ were doped to the first core portion. Chlorine, fluorine, and high-concentration GeO$_2$ were doped to the second core portion. The cladding section also had a refractive index profile. Chlorine and fluorine were doped to a first cladding portion with a low refractive index, and chlorine was doped to a second cladding portion with a high refractive index.

Figure 10:
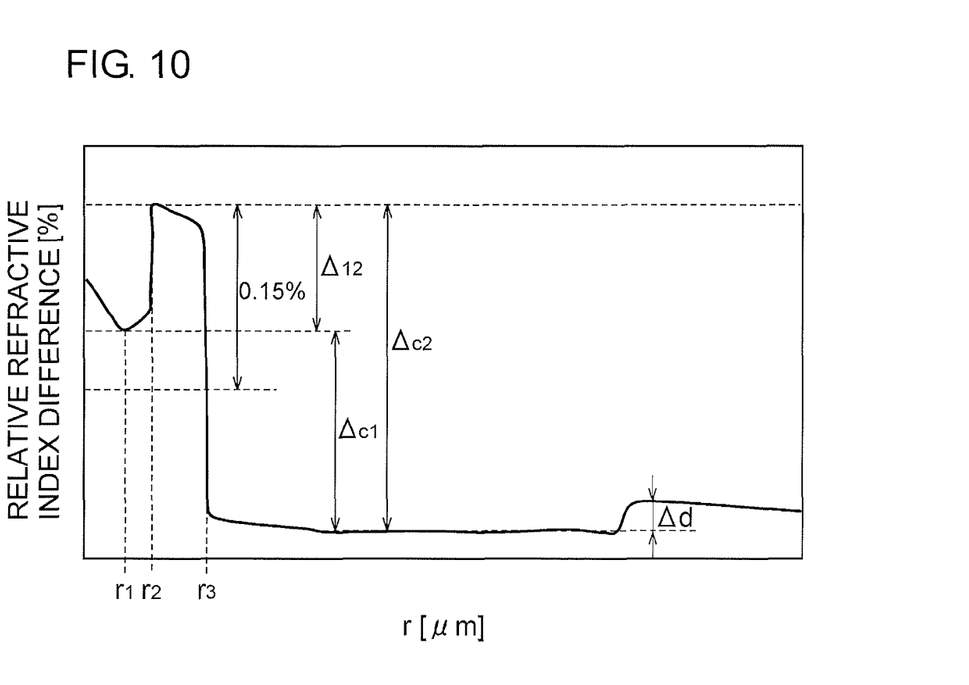
FIG. 10 is a conceptual diagram showing a refractive index profile of each of optical fibers according to Examples 6 to 10.

FIG. 10 is an illustration schematically showing a refractive index profile of each of the optical fibers according to Examples 6 to 10. In each of the optical fibers according to Examples 6 to 10, a core section included a first core portion with a low refractive index and a second core portion with a high refractive index. Low-concentration chlorine and fluorine were doped to the first core portion. High-concentration chlorine was doped to the second core portion. The cladding section also had a refractive index profile. Chlorine and high-concentration fluorine were doped to a first cladding portion with a low refractive index, and chlorine and low-concentration fluorine were doped to a second cladding portion with a high refractive index. Also, very-low-concentration potassium was doped to each of the first core section, second core section, and first cladding section. The average concentration of potassium in the core section was several atomic ppm or smaller.

In either of the optical fibers according to Examples 1 to 10, a cladding glass portion had an outer diameter in a range from about 124 µm to 126 µm. A primary coating portion had an outer diameter in a range from 185 µm to 195 µm, and a Young's modulus in a range from 0.3 MPa to 0.6 MPa. A secondary coating portion had an outer diameter in a range from 235 µm to 250 µm, and a Young's modulus in a range from 1200 MPa to 1500 MPa. The attenuation was measured in a state in which an optical fiber with a length of about 50 km was wound around a bobbin having a mandrel with a diameter of 170 mm, with a winding tension of about 0.5 N. The dissimilar splice was made with a commercially available fusion splicer, and software for similar splicing of standard single mode fibers through core alignment. When the dissimilar splice loss was measured, an optical fiber according to each Example was fusion spliced to a SSMF (MFD=10.5 µm, Aeff=85 µm$^2$, k value=0.982) or a NZ-DSF (MFD=9.6 µm, Aeff=71 µm$^2$, k value=0.981) ten times and the maximum value and minimum value of ten splice losses were obtained.

Tables II to V are tables showing characteristics of the optical fibers according to Examples 1 to 10. As it was found from these tables, any of the optical fibers according to Examples 1 to 10 could provide good characteristics.

TABLE II

| Example | $r_1$ µm | $r_2$ µm | $r_3$ µm | R ($r_3/r_2$) | $\Delta_{12}$ % | $\Delta_{c1}$ % | $\Delta_{c2}$ % | $\Delta d$ % |
|---|---|---|---|---|---|---|---|---|
| 1 | 0.0 | 4.1 | 5.40 | 1.3 | 0.19 | 0.16 | 0.35 | 0.04 |
| 2 | 0.1 | 4.4 | 5.75 | 1.3 | 0.18 | 0.15 | 0.33 | 0.05 |
| 3 | 0.0 | 4.1 | 5.10 | 1.2 | 0.23 | 0.16 | 0.39 | 0.03 |
| 4 | 0.2 | 3.8 | 4.68 | 1.2 | 0.29 | 0.15 | 0.44 | 0.04 |
| 5 | 0.1 | 4.2 | 5.14 | 1.2 | 0.29 | 0.15 | 0.44 | 0.07 |
| 6 | 1.8 | 2.2 | 6.20 | 2.8 | 0.15 | 0.19 | 0.34 | 0.06 |
| 7 | 1.6 | 2.2 | 6.60 | 3.0 | 0.14 | 0.16 | 0.30 | 0.06 |
| 8 | 2.9 | 3.2 | 5.50 | 1.7 | 0.14 | 0.27 | 0.41 | 0.07 |
| 9 | 1.0 | 2.8 | 5.50 | 2.0 | 0.26 | 0.14 | 0.40 | 0.08 |
| 10 | 2.0 | 2.4 | 4.90 | 2.0 | 0.24 | 0.26 | 0.50 | 0.04 |

TABLE III

| | | | | Attenuation | | | |
|---|---|---|---|---|---|---|---|
| Example | MFD @ 1550 nm µm | Aeff @ 1550 nm µm$^2$ | K value | @1310 nm dB/km | @1380 nm dB/km | @1550 nm dB/km | @1625 nm dB/km |
| 1 | 12.4 | 131 | 1.085 | 0.322 | 0.314 | 0.187 | 0.203 |
| 2 | 12.9 | 143 | 1.095 | 0.315 | 0.307 | 0.083 | 0.200 |
| 3 | 12.1 | 129 | 1.122 | 0.320 | 0.312 | 0.186 | 0.203 |
| 4 | 11.2 | 109 | 1.107 | 0.325 | 0.314 | 0.188 | 0.204 |
| 5 | 11.5 | 122 | 1.175 | 0.327 | 0.315 | 0.189 | 0.204 |
| 6 | 12.1 | 128 | 1.114 | 0.276 | 0.280 | 0.159 | 0.176 |
| 7 | 12.8 | 142 | 1.104 | 0.266 | 0.275 | 0.154 | 0.175 |
| 8 | 11.5 | 115 | 1.108 | 0.280 | 0.420 | 0.160 | 0.177 |
| 9 | 11.9 | 134 | 1.205 | 0.275 | 0.274 | 0.158 | 0.176 |
| 10 | 10.5 | 102 | 1.179 | 0.288 | 0.440 | 0.165 | 0.181 |

TABLE IV

| Example | Dispersion @1550 nm ps/nm/km | Slope @1550 nm ps/nm$^2$/km | Zero-dispersion wavelength µm | Fiber cutoff wavelength µm | Cable cutoff wavelength µm |
|---|---|---|---|---|---|
| 1 | 20.0 | 0.063 | 1.29 | 1.45 | 1.37 |
| 2 | 20.2 | 0.063 | 1.29 | 1.52 | 1.44 |
| 3 | 19.8 | 0.062 | 1.29 | 1.44 | 1.37 |
| 4 | 19.1 | 0.063 | 1.30 | 1.40 | 1.31 |
| 5 | 19.6 | 0.064 | 1.30 | 1.63 | 1.44 |
| 6 | 20.8 | 0.061 | 1.27 | 1.52 | 1.40 |
| 7 | 20.8 | 0.061 | 1.27 | 1.61 | 1.49 |
| 8 | 20.7 | 0.060 | 1.27 | 1.48 | 1.37 |
| 9 | 19.3 | 0.063 | 1.30 | 1.52 | 1.41 |
| 10 | 19.3 | 0.060 | 1.29 | 1.56 | 1.46 |

TABLE V

| Ex. | Bend loss (20 mm φ) @1550 nm dB/m | Bend loss (30 mm φ) @1550 nm dB/m | (60 mm φ) Maximum value between 1520 nm and 1625 nm dB/m | Micro-bend loss @1550 nm dB/km | Splice loss to SSMF @1550 nm dB/facet | Splice loss to NZDSF @1550 nm dB/facet |
|---|---|---|---|---|---|---|
| 1 | 17 | 2.3 | 0.004 | 0.5 | 0.10 to 0.18 | 0.26 to 0.35 |
| 2 | 22 | 2.4 | 0.005 | 0.6 | 0.17 to 0.28 | 0.37 to 0.49 |
| 3 | 10 | 1.8 | 0.002 | 0.5 | 0.08 to 0.15 | 0.22 to 0.30 |
| 4 | 12 | 1.2 | 0.002 | 0.3 | 0.01 to 0.06 | 0.10 to 0.18 |
| 5 | 7 | 0.9 | 0.001 | 0.5 | 0.04 to 0.10 | 0.13 to 0.21 |
| 6 | 4 | 0.5 | 0.0005 | 0.4 | 0.08 to 0.16 | 0.22 to 0.30 |
| 7 | 6 | 0.9 | 0.0001 | 0.6 | 0.16 to 0.29 | 0.34 to 0.50 |
| 8 | 3 | 0.5 | 0.0005 | 0.4 | 0.03 to 0.09 | 0.14 to 0.22 |
| 9 | 9 | 1.2 | 0.0001 | 0.5 | 0.06 to 0.12 | 0.19 to 0.30 |
| 10 | 2 | 0.3 | 0.0003 | 0.2 | 0.01 to 0.04 | 0.03 to 0.10 |

What is claimed is:

1. An optical fiber comprising:
a core section; and
a cladding section,
wherein, at a wavelength of 1550 nm,
a k value expressed by $k=4A_{eff}/(\pi MFD^2)$ is 1.08 or larger, Aeff being an effective area and MFD being a mode field diameter,
a chromatic dispersion is +19.0 ps/nm/km or larger and +21.9 ps/nm/km or smaller, and
the mode field diameter MFD is 10.3 µm or larger and 13.0 µm or smaller.

2. The optical fiber according to claim 1, wherein the effective area Aeff at the wavelength of 1550 nm is 100 µm² or larger.

3. The optical fiber according to claim 1, wherein an attenuation at the wavelength of 1550 nm is 0.19 dB/km or smaller.

4. The optical fiber according to claim 3, wherein the core section is made of silica glass containing a halogen element with an average concentration of 1000 atomic ppm or larger and not containing a typical metal element and a transition metal element as a dopant with an average concentration larger than 0.01 atomic ppm.

5. The optical fiber according to claim 4, wherein the core section contains an alkali metal element with an average concentration in a range from 0.01 atomic ppm to 50 atomic ppm.

6. The optical fiber according to claim 1, wherein a dissimilar splice loss at an splicing position with respect to a standard single mode optical fiber is 0.4 dB or smaller at the wavelength of 1550 nm.

7. The optical fiber according to claim 1, wherein an attenuation at the wavelength of 1550 nm is 0.19 dB/km or smaller when the optical fiber is wound around the periphery of a mandrel with a diameter of 220 mm, with a winding tension of 0.4 N or larger by a length of 10 km or larger.

8. The optical fiber according to claim 1, wherein, $R=r_3/r_2$ is larger than 1.0 and equal to or smaller than 8.0, $r_2$ being a radial position at which the refractive index becomes a maximum value $N_2$ in the core section and $r_3$ being a radius of the core section, and wherein
the cladding section includes at least a first cladding portion having a refractive index $N_O$ and a second cladding portion arranged at the outer periphery of the first cladding portion and having a refractive index $N_{O2}$, $N_O<N_{O2}$ is established, and a relative refractive index difference Δd of the second cladding portion with reference to the first cladding portion is 0.08% or higher.

9. The optical fiber according to claim 8, wherein $R=r_3/r_2$ is 1.2 or larger.

10. The optical fiber according to claim 1, wherein, $r_1<r_2<r_3$ is established, $R=r_3/r_2$ is larger than 1.0 and equal to or smaller than 5.4, $r_1$ being a radial position at which a refractive index becomes a minimum value $N_1$ in the core section, $r_2$ being a radial position at which the refractive index becomes a maximum value $N_2$ in the core section, and $r_3$ being a radius of the core section, and
a relative refractive index difference $\Delta_{12}$ of the maximum value $N_2$ with respect to the minimum value $N_1$ of the refractive index in the core section is 0.05% or higher.

11. The optical fiber according to claim 10, wherein $R=r_3/r_2$ is 1.2 or larger.

12. The optical fiber according to claim 10, wherein the relative refractive index difference $\Delta_{12}$ is 0.2% or lower.

13. The optical fiber according to claim 1, wherein, $r_1<r_2<r_3$ is established, $R=r_3/r_2$ is larger than 1.0 and equal to or smaller than 6.0, $r_1$ being a radial position at which a refractive index becomes a minimum value $N_1$ in the core section, $r_2$ being a radial position at which the refractive index becomes a maximum value $N_2$ in the core section, and $r_3$ being a radius of the core section, and
a relative refractive index difference $\Delta_{12}$ of the maximum value $N_2$ with respect to the minimum value $N_1$ of the refractive index in the core section is 0.05% or higher, and wherein
the cladding section includes at least a first cladding portion having a refractive index $N_O$ and a second cladding portion arranged at the outer periphery of the first cladding portion and having a refractive index $N_{O2}$, $N_O<N_{O2}$ is established, and a relative refractive index difference Δd of the second cladding portion with reference to the first cladding portion is 0.05% or higher.

14. The optical fiber according to claim 13, wherein $R=r_3/r_2$ is 1.2 or larger.

15. The optical fiber according to claim 13, wherein the relative refractive index difference $\Delta_{12}$ is 0.2% or lower.

16. An optical fiber comprising:
a core section; and
a cladding section,
wherein, $r_1<r_2<r_3$ is established, $R=r_3/r_2$ is larger than 1.0 and equal to or smaller than 5.4, a relative refractive index difference $\Delta_{12}$ of the maximum value $N_2$ with respect to the minimum value $N_1$ of the refractive index in the core section is in a range from 0.05% to 0.2%, and 4.5 µm≤$r_3$≤7.0 µm is established, $r_1$ being a radial position at which a refractive index becomes a minimum value $N_1$ in the core section, $r_2$ being a radial position at which the refractive index becomes a maximum value $N_2$ in the core section, and $r_3$ being a radius of the core section,
wherein a relative refractive index difference $\Delta_{c2}$ of the maximum value $N_2$ with respect to a refractive index $N_O$ at a radial position $r_O$ at a distance that is three times the radius $r_3$ from the center of the core section is 0.25% or higher and 0.55% or lower, and a relative refractive index difference $\Delta_{c1}$ of the minimum value $N_1$ with respect to the refractive index $N_O$ is 0.05% or higher, and
wherein, at a wavelength of 1550 nm, a k value expressed by $k=4A_{eff}/(\pi MFD^2)$ is 1.08 or larger, Aeff being an effective area and MFD being a mode field diameter, a chromatic dispersion is +19 ps/nm/km or larger, and the mode field diameter MFD is 10.3 µm or larger.

17. The optical fiber according to claim 16, wherein $R=r_3/r_2$ is 1.2 or larger.

18. An optical fiber comprising:
a core section; and
a cladding section,
wherein, $r_1<r_2<r_3$ is established, and $R=r_3/r_2$ is larger than 1.0 and equal to or smaller than 6.0, $r_1$ being a radial position at which a refractive index becomes a minimum value $N_1$ in the core section, $r_2$ being a radial position at which the refractive index becomes a maximum value $N_2$ in the core section, and $r_3$ being a radius of the core section,
wherein a relative refractive index difference $\Delta_{12}$ of the maximum value $N_2$ with respect to the minimum value $N_1$ of the refractive index in the core section is in a range from 0.05% to 0.20%,
wherein 4.5 µm≤$r_3$≤7.0 µm is established,
wherein a relative refractive index difference $\Delta_{c2}$ of the maximum value $N_2$ with respect to a refractive index $N_O$ at a radial position $r_O$ at a distance that is three times the radius $r_3$ from the center of the core section is 0.25% or higher and 0.55% or lower, and a relative refractive index difference $\Delta_{c1}$ of the minimum value $N_1$ with respect to the refractive index $N_O$ is 0.05% or higher,
wherein the cladding section includes at least a first cladding portion having the refractive index $N_O$ and a second cladding portion arranged at the outer periphery of the first cladding portion and having a refractive index $N_{O2}$, $N_O<N_{O2}$ is established, and a relative refractive index difference Δd of the second cladding portion with reference to the first cladding portion is 0.05% or higher, and
wherein, at a wavelength of 1550 nm, a k value expressed by $k=4Aeff/(\pi MFD^2)$ is 1.08 or larger, Aeff being an effective area and MFD being a mode field diameter, a chromatic dispersion is +19 ps/nm/km or larger, and the mode field diameter MFD is 10.3 µm or larger.

19. The optical fiber according to claim 18, wherein $R=r_3/r_2$ is 1.2 or larger.

20. An optical fiber comprising:
a core section; and
a cladding section,
wherein, $r_1<r_2<r_3$ is established, and $R=r_3/r_2$ is larger than 1.0 and equal to or smaller than 8.0, $r_1$ being a radial position at which a refractive index becomes a minimum value $N_1$ in the core section, $r_2$ being a radial position at which the refractive index becomes a maximum value $N_2$ in the core section, and $r_3$ being a radius of the core section,
wherein a relative refractive index difference $\Delta_{12}$ of the maximum value $N_2$ with respect to the minimum value $N_1$ of the refractive index in the core section is in a range from 0.05% to 0.20%,
wherein 4.5 µm≤$r_3$≤7.0 µm is established,
wherein a relative refractive index difference $\Delta_{c2}$ of the maximum value $N_2$ with respect to a refractive index $N_O$ at a radial position $r_O$ at a distance that is three times the radius $r_3$ from the center of the core section is 0.25% or higher and 0.55% or lower, and a relative refractive index difference $\Delta_{c1}$ of the minimum value $N_1$ with respect to a refractive index $N_O$ is 0.05% or higher,
wherein the cladding section includes at least a first cladding portion having the refractive index $N_O$ and a second cladding portion arranged at the outer periphery of the first cladding portion and having a refractive index $N_{O2}$, $N_O<N_{O2}$ is established, and a relative refractive index difference Δd of the second cladding portion with reference to the first cladding portion is 0.08% or higher, and
wherein, at a wavelength of 1550 nm, a k value expressed by $k=4Aeff/(\pi MFD^2)$ is 1.08 or larger, Aeff being an effective area and MFD being a mode field diameter, a chromatic dispersion is +19 ps/nm/km or larger, and the mode field diameter MFD is 10.3 µm or larger.

21. The optical fiber according to claim 20, wherein $R=r_3/r_2$ is 1.2 or larger.

\* \* \* \* \*